United States Patent [19]

Idler

[11] Patent Number: 4,726,259
[45] Date of Patent: Feb. 23, 1988

[54] MOTORIZED POSITIONER

[76] Inventor: Richard L. Idler, 2659 Gray St., Denver, Colo. 80214

[21] Appl. No.: 902,157

[22] Filed: Aug. 29, 1986

[51] Int. Cl.⁴ .............................. F16H 3/44; H01Q 3/02
[52] U.S. Cl. ................................. 74/785; 74/788; 74/801; 74/479; 343/882
[58] Field of Search ............... 74/768, 785, 788, 801; 343/882, 766, 765

[56] References Cited

U.S. PATENT DOCUMENTS

| 3,081,648 | 3/1963 | Duer | 74/801 |
| 3,596,538 | 8/1971 | Braun | 74/801 |
| 3,792,629 | 2/1974 | Applebury | 74/801 |
| 4,040,312 | 8/1977 | Tappan et al. | 74/801 |
| 4,280,376 | 7/1981 | Rosen | 74/801 X |
| 4,580,461 | 4/1986 | Sears et al. | 343/765 X |
| 4,626,864 | 12/1986 | Micklethwaite | 343/766 |
| 4,652,887 | 3/1987 | Cresswell | 343/766 |

FOREIGN PATENT DOCUMENTS

| 2930052 | 2/1981 | Fed. Rep. of Germany | 74/768 |
| 0120201 | 9/1980 | Japan | 343/765 |
| 0887835 | 12/1981 | U.S.S.R. | 74/801 |

*Primary Examiner*—Lawrence Staab
*Assistant Examiner*—James W. Innskeep
*Attorney, Agent, or Firm*—Martin Anderson

[57] ABSTRACT

A motorized positioner comprising a compact arrangement of two-stage sun and planetary gear sets. The first stage planetary gears are reacted by an internal ring gear of an upper housing. The second stage planetary gears are reacted by an internal ring gear of both upper and lower housings, thereby creating relative rotation between upper and lower housing portions. The drive motor is mounted on the upper housing which comprises the output shaft.

1 Claim, 4 Drawing Figures

MOTORIZED POSITIONER

FIELD OF THE INVENTION

This invention relates to motorized positioners, and more particularly to a horizon to horizon polar mount motorized positioner to facilitate the positioning of antennas for receiving signals from geosynchronous satellites.

BACKGROUND OF THE INVENTION

Antennas for receiving signals from geosynchronous satellites typically are attached to a motorized drive system enabling an operator to change the antenna position to receive signals from a number of different satellites. The prior art drive systems for this application have typically consisted of motorized linear actuators such as a telescoping ball screw or a worm gear capable of moving the antenna through a limited arc such as 90 degrees or 120 degrees. The limited travel of most prior art drive systems has prevented horizon to horizon coverage of all available satellites. Some drive systems achieve horizon to horizon coverage by utilizing an arrangement of cables and pulleys.

It is therefore a primary object of this invention to provide a satellite antenna drive system that is compact, provides horizon to horizon coverage, has a higher operating efficiency and is capable of handling greater loads than previous satellite antenna drives.

SUMMARY OF THE INVENTION

The invention is broadly directed to a motorized positioner in the form of a gear box comprising a housing having an upper and lower portion with bearing races and oil seals to permit relative motion between the housing portions. The lower portion of the housing has an internal ring gear and is mounted in a fixed position. The rotatable upper portion of the housing has an internal ring gear and comprises the output shaft of the gear box to which the antenna is attached with suitable mounting hardware. The drive motor is attached to the exterior of the upper portion of the housing with the drive motor shaft extending into the housing and comprising a first sungear.

The first sun gear engages three first planetary gears which react with the internal ring gear of the upper portion of the housing and are carried by the first planetary carrier. The second sun gear is attached to the first planetary carrier and engages the upper portion of three compound pinion gears having slightly different pitch diameters between the upper and lower portions. The compound pinion gears comprise the second planetary gears being carried in a second planetary carrier. The lower portion of the compound pinion gears react with the internal ring gear of the lower portion of the housing. The upper portion of the compound pinion gears are reacted by the internal ring gear of the upper housing portion. A compact, robust, efficient, horizon to horizon satellite antenna gear box is thus achieved by use of stacked sun and planetary gear arrangement and by mounting the drive motor on the output shaft of the gear box.

DESCRIPTION OF THE PREFERRED EMBODIMENT

Figure 1:
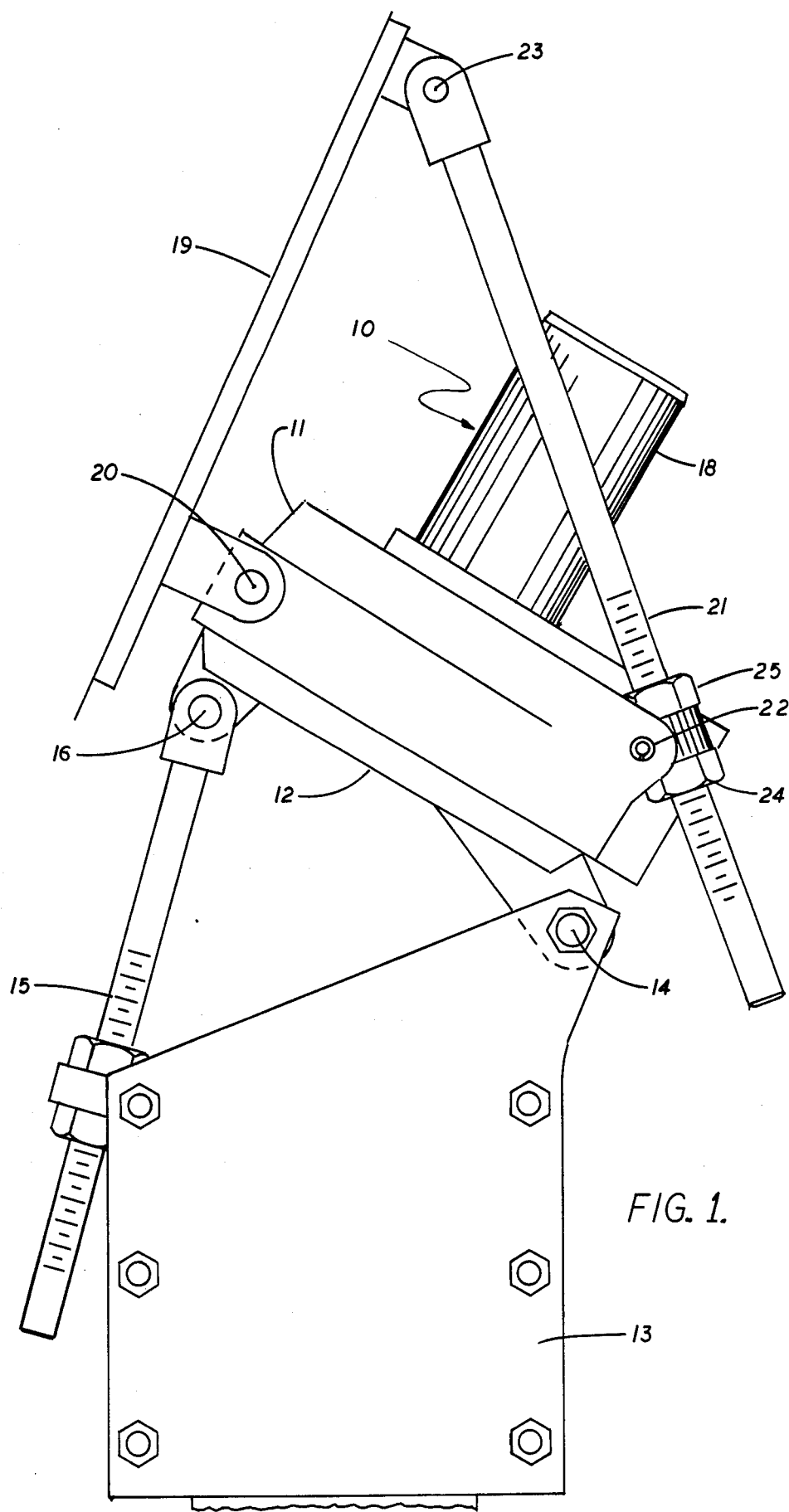
FIG. 1 is an illustration of the present invention adapted to provide horizon to horizon coverage for a satellite antenna.

As shown in FIG. 1, a horizon to horizon polar mount motorized positioner 10 is adapted to support and position a satellite antenna (not shown). The upper housing portion 11 fits over lower housing portion 12. Housing portions 11 and 12 have an annular bearing race (not shown) that are opposite each other when housing portions 11 and 12 are fitted together. The race and associated ball bearings permit relative rotation of housing portions 11 and 12 as well as locking housing portions 11 and 12 together. Lower housing portion 12 is attached to a stationary bracket 13 at pivot 14. A threaded bolt 15 connects lower housing 12 to bracket 13 at pivot 16.

Adjusting threaded bolt 15 aligns the axis of drive motor 18 parallel to the earth's axis (i.e. points the motor axis toward the north star). Antenna mounting plate 19 is attached to upper housing portion 11 at pivot 20. Threaded bolt 21 is attached to antenna mounting plate 19 at pivot 23 and to upper housing portion 11 at point 22. Adjusting threaded bolt 21 aligns the antenna attached to mounting plate 19 with the plane of geosynchronous satellites in orbit over the equator (i.e. adjusting threaded bolt 21 sets the correct declination angle of the antenna for a given lattitude on the earth's surface).

Drive motor 18 is mounted on upper housing portion 11. Upper housing portion 11 is the output shaft of the gear box as it carries the load of the antenna and mounting plate 19. The antenna attached to mounting plate 19 is capable of horizon to horizon positioning as upper housing portion 11 rotates about the polar axis.

The application just described is particularly suitable for satellite antennas. However, with slight modification of mounting hardware, the invention would be equally suitable for positioning telescopes or terrestrial antennas through 360 degrees. The present invention may also be adapted to any application, such as winches, which require a robust, high gear ratio reduction gear box.

Figure 2:
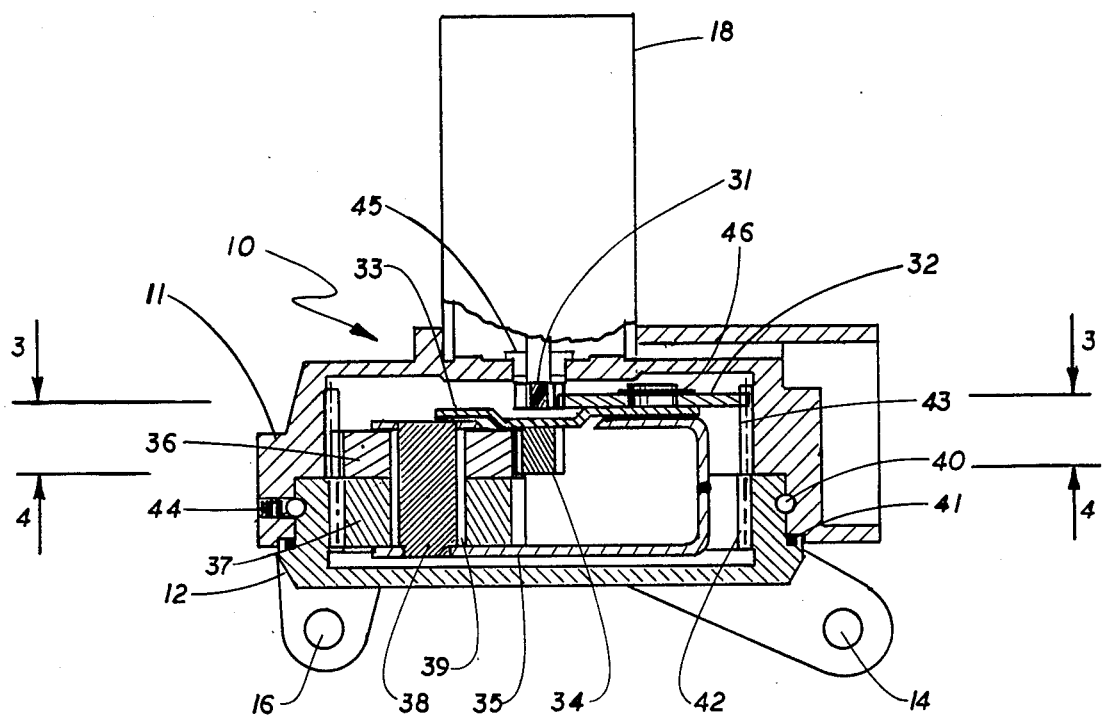
FIG. 2 is a side view of the invention.
Figure 3:
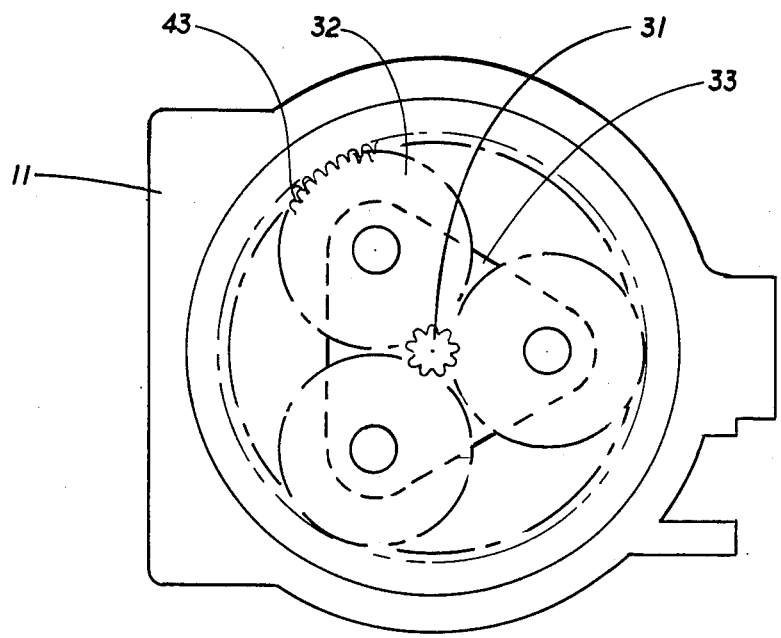
FIG. 3 is a cross section along line 3—3 in FIG. 2.
Figure 4:
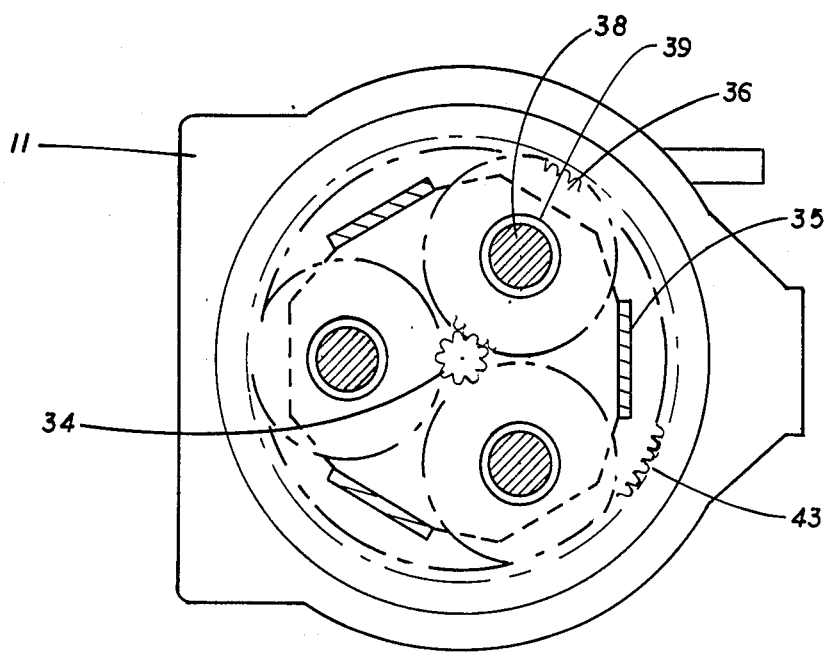
FIG. 4 is a cross section along line 4—4 in FIG. 2.

Referring now to FIGS. 2, 3, and 4, the structure and operation of the present invention 10 will be described. The housing of the present invention 10 consists of upper housing portion 11 and lower housing portion 12. Lower housing portion 12 contains an internal toothed ring gear 42 having, for example, 54 teeth of 10 diametrial pitch, and a pitch diameter of 5.4 inches. An O ring seal or chevron seal 41 fits in an annular recessed groove in lower housing portion 12 and mates with a seal land in upper housing portion 11.

An annular ball bearing race in the form of a semicircular groove is formed in the outer periphery of lower housing portion 12 and is in contact with ball bearings 40. A matching annular bearing race is formed on the inner periphery of upper housing portion 11 and is in contact with ball bearings 40. At final assembly upper housing portion 11 is placed over lower housing portion 12. A plurality of ball bearings 40 are inserted through hole 44 into the race formed by the opposing grooves in the upper and lower housing portions 11 and 12. After ball bearings 40 are inserted into the race, hole 44 is sealed with an appropriate plug. Ball bearings 40 permit relative rotation between housing portions 11 and 12 and lock housing portions 11 and 12 together.

Upper housing portion 11 has an internal toothed ring gear diameter of 5.5 inches. Drive motor 18, which may typically be a 1/7 horsepower, 2500 rpm motor, is fixedly attached to the exterior of upper housing portion 11. Drive motor 18 shaft extends through motor bushing 45, which is seated in an opening in upper housing portion 11. Motor gear 31 is attached to drive motor 18 shaft and functions as a first stage sun gear. First stage sun gear 31, which is addendum modified, meshes with three first stage planetary gears 32, which are rotatably attached to first stage carrier 33 with snap rings 46. First stage planetary gears 32, which are addendum modified and may be fabricated of nylon for noise reduction, are reacted by addendum modified internal ring gear 43.

Second stage sun gear 34, which is addendum modified, is fixedly attached to the side of carrier 33 opposite the first stage planetary gears 32, a gear reduction ratio of 12:1 is achieved from first stage sun gear 31 to first stage carrier 33. Second stage sun gear 34, which is addendum modified, engages the addendum modified upper portion 36 of three metal compound pinion gears having upper part 36 integral with lower part 37. The compound pinions upper part 36 having a pitch diameter of 2.5 inches are reacted by upper housing internal ring 43. The compound pinions lower part 37 having a pitch diameter of 2.4 inches are reacted by lower housing internal ring gear 42. Compound pinions upper part 36 and lower part 37 have slightly different pitch diameters, for example 0.1 inches, giving a gear reduction ratio of 45:1.

The difference in pitch diameters between compound pinion upper part 36 and lower part 37 effects rotation of upper housing portion 11 relative to lower housing portion 12 in the same direction as sun gear 31. Upper housing portion 11 will rotate opposite to the direction of first sun gear 31 if the pitch diameter of internal ring gear 42 is greater than the pitch diameter of internal ring gear 43. Rotation may also be effected using compound pinions with differing number of teeth. Compound pinions comprised of upper part 36 and lower part 37 are rotatably mounted on second stage planetary carrier 35 by means of bushing 39 and pin 38. A gear reduction ratio of 12:1 is achieved between second sun gear 34 and second stage plantary carrier 35. A total gear reduction ratio of 6480:1 was chosen for the preferred embodiment. However, it will be appreciated by those skilled in the art that different gear ratios may be provided for specific applications. It is also apparent that the present invention may be inverted such that upper housing portion 11 is attached to a stationary mounting and lower housing portion 12 rotates.

Although the invention has been described with respect to a preferred embodiment, the words chosen are words of description rather than limitation. It is apparent that many alterations and rearrangements of the parts may be made without departing from the spirit and scope of the present invention as defined by the appended claims.

What is claimed is:

1. A motorized positioning apparatus comprising:

a housing having a first and second portion forming an internal cavity, said first and second housing portions each having integral internal toothed ring gears and adapted to rotate relative to each other through 360 degrees, said housing having a single aperture extending from exterior of said first housing portion to said internal cavity, said first housing portion comprises an output shaft to which is coupled a structure to be rotated, said second housing portion is coupled to a stationary mount, a drive motor fixedly attached to exterior of said first housing portion, shaft of said drive motor extending through said aperture to interior of said housing and terminated in a first sun gear, a plurality of first planetary gears rotatably mounted on a first carrier, said first planetary gears engage said first sun gear and are reacted by said first housing portion internal ring gear, a second sun gear fixedly attached to side of said first carrier opposite said first planetary gears, a plurality of second planetary gears rotatably mounted on a second planetary carrier, said second planetary gears comprise dual compound pinions having upper and lower portions of different pitch diameters and different numbers of teeth, upper portion of said dual compound pinions being engaged by said second sun gear and reacted by said first housing portion internal ring gear, lower portion of said dual compound pinions being reacted by said second housing portion internal ring gear, first adjustment means coupled to said second housing portion for positioning axis of said drive motor at a selected angle, said first adjustment means comprising a first and second appendage fixedly attached on opposite sides of said second housing portion, said second appendage pivotally attached to said stationary mount through a threaded bolt for positioning axis of said drive motor, and second adjustment means coupled to said first housing portion for positioning said coupled structure at a selected angle, said second adjustment means comprising a third and fourth appendage fixedly attached, a selected distance apart, to said coupled structure, said third appendage pivotally attached to said first housing portion, said fourth appendage pivotally attached to said first housing portion through a threaded bolt for positioning said coupled structure.

* * * * *